May 28, 1940.  J. GRANT  2,202,100
GLASS COOLING APPARATUS
Filed Jan. 31, 1939
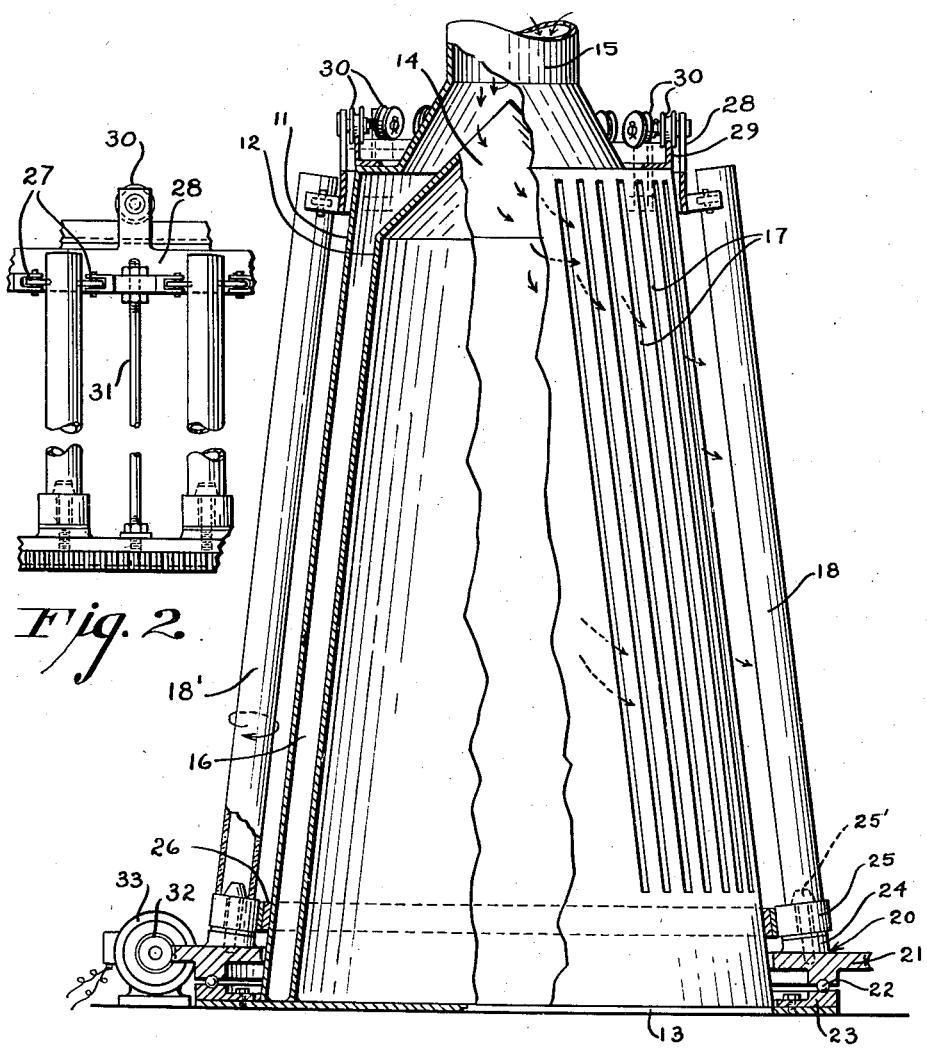
INVENTOR.
JESSE GRANT
BY Dorsey, Cole & Garner
ATTORNEYS.

Patented May 28, 1940

2,202,100

UNITED STATES PATENT OFFICE 2,202,100

GLASS COOLING APPARATUS

Jesse Grant, Corning, N. Y., assignor to Corning Glass Works, Corning, N. Y., a corporation of New York Application January 31, 1939, Serial No. 253,841

4 Claims. (Cl. 49—14)

The present invention relates to glass cooling apparatus and more particularly to a form of apparatus especially adapted for the receipt and cooling of glass cylinders immediately after being disassociated from their forming apparatus.

One object of the invention is the cooling of glass cylinders.

Another object of the invention is a convenient form of apparatus for the receipt of glass cylinders as they are formed and which is adapted to cool such cylinders to a temperature convenient for handling as fast as they are being formed.

The invention embodies among its features a conically shaped stationary air chamber having a series of vertically disposed slots therein through which cooling air is directed to glass cylinders placed on a conveyor rotating about such chamber and about their own axes, whereby even cooling of such cylinders is effected.

In the accompanying drawing

Fig. 1 is a sectional side elevation of an apparatus embodying the preferred form of the invention; and Fig. 2 is a fragmentary view illustrating constructional details not clear in Fig. 1.

The foregoing apparatus includes two concentrically arranged conically shaped metal cylinders 11 and 12 soldered or otherwise secured to a sheet metal base 13, thereby forming an annular air chamber 16 between the inner and outer walls of cylinders 11 and 12. The upper end of cylinder 12 is closed by a conical cap 14 whereas the upper end of cylinder 11 is connected with a stack 15 supplied with cooling air from any suitable source (not shown). The cylinder 11 is provided with a series of vertically disposed slots 17 through which streams of cooling air, supplied to chamber 16, are impinged against the side walls of glass cylinders, such as 18 and 18', carried in an annular path surrounding the conical cylinder 11 by a conveyor generally designated 20.

The conveyor 20 includes a ring gear 21 surrounding the conical cylinder 11 and having a ball race formed on the under surface thereof resting on ball bearings 22 operative in a stationary ball race 23. Suitably spaced about the upper surface of gear 21 are bosses 24 drilled to accommodate shafts for glass cylinder supporting rollers 25 arranged in frictional engagement with a fixed track 26 whereby rotation of the rollers about their own axes is effected as the conveyor 20 rotates about cylinder 11. Glass cylinders 18 and 18' to be cooled are set on end on rollers 25 and are held in coaxial relation therewith by conical bosses 25' on the upper sides of such rollers. The upper ends of such glass cylinders rest against rollers 27 carried by an annular frame 28 forming a part of the conveyor assembly 20. The frame 28 is equipped with grooved rollers 30 traveling on an annular track 29 mounted on the top of cylinder 11 and is rigidly connected to the ring gear 21 by means of a plurality of rods 31. A worm 32 in mesh with the teeth of gear 21 and driven by a suitable motor 33 effects slow rotation of the conveyor.

In the operation of the foregoing apparatus, assuming that the conveyor is rotating in a clockwise direction, an operator, upon receiving a glass cylinder 18 from its forming apparatus, places such cylinder on a roller 25 located at a point slightly to the left of the series of slots 17 and leans the top end of such cylinder against a pair of the rollers 27. As rotation of the conveyor continues, the cylinders, such as 18 and 18', are rotated about their own axes as they are slowly conveyed past the slots 17 and accordingly are effectively cooled by the time they arrive at the side of the cylinder 11 opposite the vertical slots 17 at which location cylinder 18' is shown; and are at such point removed and disposed of in any desired manner.

Although in the foregoing there has been shown and described the preferred embodiment of the invention, it is to be understood that minor changes in the details of construction and combination of parts may be resorted to without departing from the spirit and scope of the invention as claimed.

What is claimed is:

1. In a glass cooling apparatus, an air chamber having a series of slots in a wall thereof arranged in an arc, a conveyor traveling in a path concentric to the axis of such arc and having supports for tubular glass articles to be carried by said conveyor past said series of slots, and means for rotating said supports about their own axes during the movement of said conveyor.

2. In a glass cylinder cooling apparatus, a conically shaped air chamber having slots in its side wall through which air supplied to said chamber passes, a conveyor having an annular path of travel about and in close proximity to said chamber, and means on said conveyor for supporting glass cylinders thereon with their axes parallel to the adjacent side wall of the chamber.

3. In a glass cylinder cooling apparatus, two concentrically arranged circular structures sealed to a common closing member at their bottom ends, a cap sealing the interior of the inner structure from communication with the outer structure, a cap for the outer structure having an opening therein through which air may be supplied to the space between the inner and outer structures, and means for conveying glass cylinders in a substantially upright position over a path closely surrounding said outer structure, the outer structure having a series of slots therein for directing streams of air into the path of movement of such glass cylinders.

4. In a glass cylinder cooling apparatus, a generally tubular air chamber having slots in its side wall through which air supplied to said chamber passes, a conveyor having an annular path of travel about and in close proximity to said chamber, and means on said conveyor for supporting a glass cylinder thereon with its axis parallel to the adjacent side wall of the chamber.

JESSE GRANT.